May 5, 1964 W. J. SHIMANCKAS 3,131,795
SPEED AND PUSH-BUTTON CLUTCH CONTROL DEVICE
Filed March 22, 1962
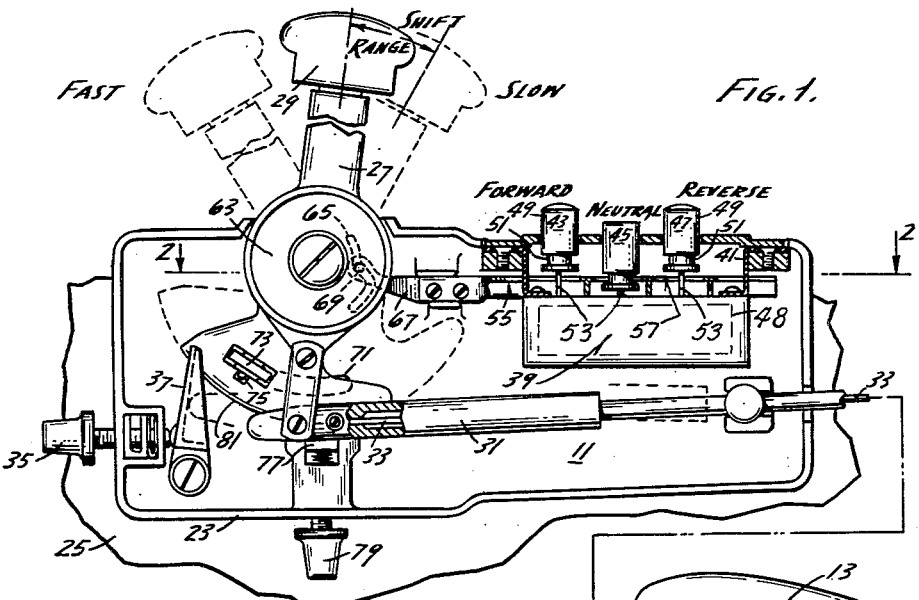
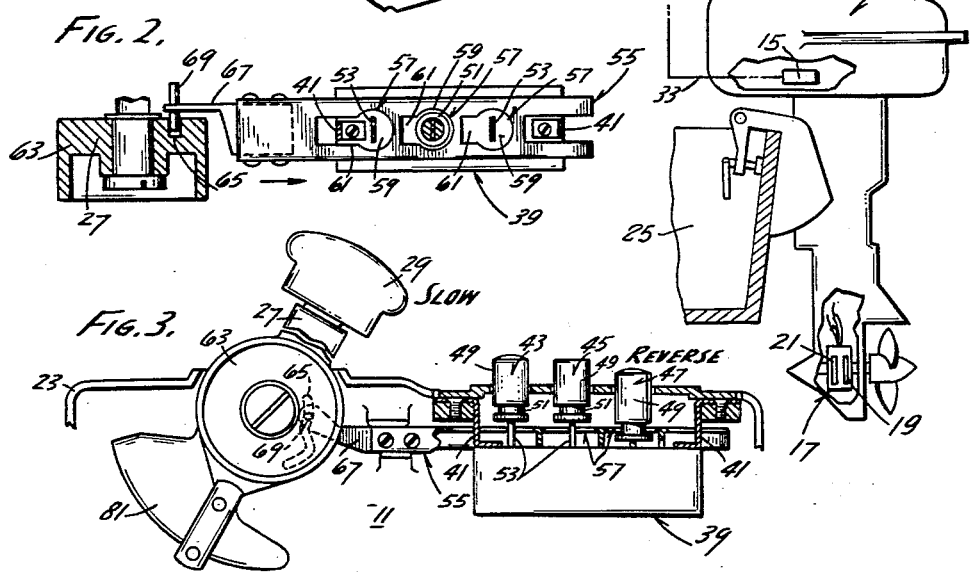
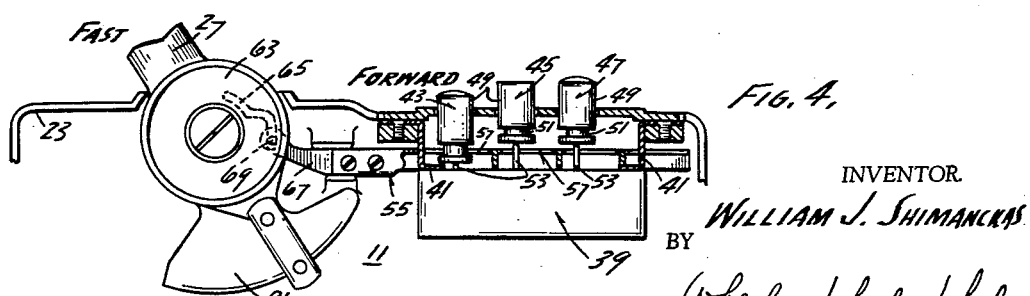
INVENTOR.
WILLIAM J. SHIMANCKAS
BY
Wheeler, Wheeler & Wheeler
ATTORNEYS.

United States Patent Office 3,131,795
Patented May 5, 1964

3,131,795
SPEED AND PUSH-BUTTON CLUTCH
CONTROL DEVICE
William J. Shimanckas, Waukegan, Ill., assignor to
Outboard Marine Corporation, Waukegan, Ill., a
corporation of Delaware
Filed Mar. 22, 1962, Ser. No. 181,577
12 Claims. (Cl. 192—.096)

The invention relates generally to speed and shift control devices for engines such as internal combustion and turbine engines. More specifically, the invention relates to speed and shift control devices for engines including electrically operated shift and clutch means.

The invention provides for a control device including a speed control lever which is reciprocal through a speed range between a low speed setting and a single high speed setting, a push-button type manual switching arrangement for actuating the electrically controlled clutch means, and an interlock between the speed control lever and switching arrangement, which interlock prevents operation of the switching arrangement when the speed control lever is above a predetermined engine throttle setting. There is also provided a releasable stop or detent which informs the operator that the speed control lever is at said predetermined throttle setting and which requires noticeable effort to advance the control lever therebeyond.

In general, the principal object of the invention is the provision of a device for controlling an engine having an adjustable throttle or speed controlling member and electrical means for operating the clutch. Another object of the invention is the combination of such a device together with a boat and an engine mounted on said boat for propulsion thereof. Other objects and advantages of the invention will become known by reference to the following description and the accompanying drawings of one embodiment of the invention. In the drawings:

FIGURE 1 is a fragmentary elevational view, partially in section and partially diagrammatic on a reduced scale, of a boat incorporating a control device in accordance with the invention. In FIGURE 1, the control device is set in neutral with the speed control lever approximately at the maximum setting permitting manual operation of the switching arrangement.

FIGURE 2 is a fragmentary sectional view taken generally along line 2—2 of FIGURE 1;

FIGURE 3 is a fragmentary elevational view, partially in section, showing the control device in slow speed reverse condition; and FIGURE 4 is a fragmentary elevational view, partially in section, showing the control device in full speed forward condition.

The speed and clutch control device 11, illustrated in FIGURE 1, is intended for control of an engine 13 (shown schematically) having an adjustable throttle or speed control member 15 and an electrically actuated clutch 17, including a pair of energizable coils 19 and 21, enabling operation of the engine in neutral, in forward drive, and in rearward drive. Forward drive of the engine 13 is provided incident to energizing of the coil 19 and rearward drive is provided incident to energizing of the coil 21. When neither of the coils 19 and 21 is energized, the engine 13 is in neutral. One example of an engine incorporating an electrically operated reversing clutch is fully disclosed in my copending application entitled "Marine Propulsion Device with Electromagnetic Reversing Clutch," Serial No. 143,773, filed on October 9, 1961, and asisgned to the assignee of this application.

Returning now to the speed and shift control device 11, said device includes a frame 23 which, as shown in FIGURE 1, is suitably mounted on the hull 25 of a boat and which includes a movably mounted operating or speed control lever 27. More specifically, in the disclosed construction, the speed control lever 27 is mounted by suitable means providing pivotal movement, and is generally elongated, including at its upper or outer end a handle knob 29. At its lower or inner end the speed control lever 27 includes a suitable pivotal connection with an anchor block 31 in which one end of a push-pull cable 33 is secured. At its other end, the push-pull cable 33 is attached to the engine throttle 15 to effect adjustment thereof incident to pivotal movement of the speed control lever 27. The throttle setting of the engine is advanced by rocking the speed control lever 27 in the counter clockwise direction from a slow speed setting toward a high or fast speed setting, which latter setting is determined by engagement of the speed control lever 27 with the frame 23. The minimum speed setting at the slow end of the throttle adjusting range can be varied as desired by means of an adjusting screw 35 which is threaded in the frame 23 and which acts against stop 37 pivotally mounted on the frame. In turn, the stop 37 is adapted to be engaged by the adjacent end of the anchor block 31, seen to the left in FIGURE 1.

Electrical control of the clutch 17 is afforded by means in the form of a push-button switch 39 mounted on the frame 23 by a suitable bracket 41. The push-button switch 39 includes, in the disclosed construction, three-generally identical buttons 43, 45, and 47, two of which, 43 and 47, operate upon depression to close respective normally open switches (not specifically shown) connected to the respective coils 19 and 21 so as to effect forward and rearward drive clutch engagements. The other button 45 constitutes a neutral button and depression of any one of the buttons 43, 45, and 47 causes elevation of any previously depressed button by a mechanism or means 48 which is conventional and does not form a specific part of the disclosed invention. The mechanism 48 is shown diagrammatically in FIGURE 1. Each of the buttons 43, 45, and 47 includes a head 49 which has an annular groove 51 and is mounted on a neck or stem 53 of lesser cross sectional dimension than the head 49.

Connecting the speed control lever 27 with the push-button switch 39 is an innerlock means preventing actuation of the switch when the speed control lever is set above a preselected engine speed. The innerlocking means comprises a slide or member 55 which is suitably guided by the frame 23 and by the bracket 41 for reciprocation relative to the buttons 43, 45, and 47. More particularly, the slide 55 incorporates a series of generally identical key-hole openings 57 correspondingly spaced and equal in number to the number of buttons. Each of the openings 57 includes a main portion 59 permitting passage of an aligned button head 49 and a stem or slot 61 designed to permit passage of the button stems 53 and to permit entry therewithin of the associated one of the grooves 51, but to prevent passage of the associated relatively large head 49. As a result, when the main portions 59 of the openings 57 are in alignment with the buttons, as shown in FIGURE 2, the switch 39 can be manually operated. However, as shown in FIGURE 4, when the slide 55 is moved to the right, one of the slots 61 engages the groove 51 of one of the buttons 43, 45, and 47, while the other slots 61 permit entry therein of the stems 53 of the other two of the buttons 43, 45, and 47. In this condition, manual operation of the switch is prevented.

The slide 55 is connected to the speed control lever 27 to effect movement thereof relative to the buttons 43, 45, and 47 incident to pivotal movement of the speed control lever. More particularly, in the disclosed construction, the slide 55 is connected to the speed control lever 27 by a cam slot and follower connection which is arranged to dispose the slide so as to permit operation of the switch 39 during movement of the speed control lever 27 through a shift range at the low speed end of the speed control range. However, the cam slot is further arranged so that when the speed control lever 27 is displaced above a preselected position, i.e., above the shift range, the slide 55 is displaced to the right, as seen in FIGURE 4, to prevent manual actuation of the switch 39. In the specifically disclosed construction, the lever 27 includes an enlarged central part 63 including a camming slot 65, while the slide 55 has attached thereto an arm 67 including a follower 69.

The device also includes means for informing the operator of the advancement of the speed control lever 27 to the high end of the shift range. This means takes the form of an arcuate track 71 projecting outwardly from the frame 23 in such area as to be engaged only when the speed control lever 27 is at or above said predetermined setting, and a wheel or roller 73 which is located for engagement with the track 71 and is mounted on a resiliently supported axle 75 biased toward the projecting track 71 by suitable spring means. As a result, a noticeable effort is required on the part of the operator to effect movement of the roller onto the track when advancing the speed control lever 27 beyond said predetermined setting. By this arrangement there is also provided a greater frictional restraint to movement of the speed control lever 27 when above the shift range as compared to when in the shift range. By sensing the comparative frictional restraint to movement of the speed control lever 27, the operator can, without looking, determine whether the lever is, or is not, set at a sufficiently low throttle setting to permit push-button operation of the push-button switch 39.

The control device 11 further includes an overall frictional control governing the effort required for displacement of the speed control lever 27. This frictional control arrangement includes a spring biased shoe 77 which is adjustably controlled by a button 79 threaded in the frame 23, and is operable against the lower edge 81 of the speed control lever 27.

Various of the features of the invention are set forth in the following claims.

What is claimed is:

1. In a control device for an engine having a throttle and electrically operated clutch means, said device including a frame, a lever movably mounted on said frame and adapted for connection to the engine throttle for adjustment thereof between high and low engine speed settings incident to movement of said lever, and electrical switch means mounted on said frame and adapted to be connected to the engine clutch means for electrically controlling operation thereof, the improvement comprising
    manually operable means other than said lever for selectively actuating said switch means, and
    interlocking means connected to said lever for preventing operation of said actuating means when said lever is set above a predetermined engine setting.

2. An improvement in accordance with claim 1 wherein said interlocking means comprises
    a slide carried by said frame for movement relative to said actuating means between a position permtting operation of said actuating means and a position preventing operation of said actuating means, and
    means connecting said slide and said lever whereby to control movement of said slide in response to movement of said lever.

3. An improvement in accordance with claim 2 wherein said means connecting said slide and said lever comprises
    a follower on one of said slide and said lever, and
    a cam slot on the other of said slide and lever, said cam slot being engaged with said follower and being proportioned to locate said slide in said position permitting operation of said actuating means only when said lever is below said predetermined engine speed setting.

4. An improvement in accordance with claim 3 wherein said predetermined engine speed setting is above said low engine speed setting.

5. An improvement in accordance with claim 2 wherein
    said switch means includes at least two switches,
    said actuating means comprises a corresponding number of buttons each having a head and a neck of lesser cross sectional dimension than said head, and
    said slide includes a corresponding series of key-hole openings each having a stem portion permitting passage of said neck and preventing passage of said head.

6. An improvement in accordance with claim 5 wherein
    said switches are normally open, and
    each button head has a groove therein engaged by said stem of the corresponding one of said key-hole openings to prevent displacement of said button when said button is in a position closing the associated one of said switches and when said lever is located at a setting above said predetermined engine speed setting.

7. An improvement in accordance with claim 6 wherein
    said actuating means includes means operable automatically, when one of said buttons is displaced to said position closing the associated one of said switches, to locate the other of said buttons from their positions closing the associated switches.

8. In a control device for an engine having a throttle and electrically operated clutch means, the combination of
    a frame,
    a lever movably mounted on said frame and adapted for connection to the engine throttle for adjustment thereof between fast and slow engine speed settings incident to movement of said lever,
    electrical switch means mounted on said frame and adapted to be connected to the engine clutch for electrically controlling operation thereof, said switch means including
        manually operable means other than said lever for selectively actuating said switch means, and
    interlocking means connected to said lever for permitting operation of said actuating means only when said lever is set below a predetermined engine speed setting.

9. A combination in accordance with claim 8 wherein said interlocking means comprises
    a slide member carried by said frame for movement relative to said manually operable actuating means between a position permitting operation of said actuating means and a position preventing operation of said actuating means,
    a cam slot in one of said slide and said lever, and
    a follower on the other one of said slide and said lever, said follower being engaged with said cam slot, whereby to control movement of said slide in response to movement of said lever.

10. An improvement in accordance with claim 9 wherein
    said predetermined engine speed setting is above said slow engine speed setting, and
    said cam slot in proportioned to locate said slide in said position permitting operation of said actuating means only when said lever is below said predetermined engine speed setting.

11. An improvement in accordance with claim 10 wherein
    said switch means includes at least two normally open switches,
    said actuating means comprises a corresponding number of buttons each having a head and a neck of lesser cross sectional dimension than said head, said slide includes a corresponding series of key-hole openings each having a stem portion permitting passage of said neck and preventing passage of said head, and each button head has a groove therein engaged by said stem of the corresponding one of said key-hole openings to prevent displacement of said button when said button is in a position closing the associated one of said switches and when said lever is located at a setting above said predetermined engine speed setting.

12. The combination of a boat, an engine on said boat, said engine including electrically operated clutch means for shifting said engine and a throttle for controlling the speed of said engine, and a control device located on said boat remotely from said engine, said device including a lever movably mounted thereon and connected to the engine throttle for adjustment thereof between high and low engine speed settings incident to movement of said lever, electrical switch means connected to said engine clutch means for electrically controlling the operation thereof, said switch means including manually operable means other than said lever for selectively actuating said switch means, and interlocking means connected to said lever for permitting operation of said actuating means only when said lever is set below a predetermined engine speed setting.

References Cited in the file of this patent

UNITED STATES PATENTS

| | | |
|---|---|---|
| 2,231,365 | Mathews et al. | Feb. 11, 1941 |
| 2,444,324 | Allen et al. | June 29, 1948 |
| 2,540,427 | Charles et al. | Feb. 6, 1951 |
| 2,680,382 | Peterson et al. | June 8, 1954 |
| 3,036,476 | Klepper | May 29, 1962 |